United States Patent [19]

Michlovic

[11] Patent Number: 5,317,846

[45] Date of Patent: Jun. 7, 1994

[54] UNDERFLOOR WIRE DISTRIBUTING REINFORCED CONCRETE FLOOR STRUCTURE

[75] Inventor: John J. Michlovic, McMurray, Pa.

[73] Assignee: United Dominion Industries, Inc., Charlotte, N.C.

[21] Appl. No.: 676,553

[22] Filed: Mar. 28, 1991

[51] Int. Cl.$^5$ .......................... E04B 5/48; E04F 17/08
[52] U.S. Cl. ................................ 52/220.4; 52/220.2; 52/220.5; 52/250; 52/336; 52/381
[58] Field of Search ................. 52/220.1, 220.2, 220.3, 52/220.4, 220.8, 236.5, 250, 334, 335, 336, 338, 477, 381, 220.5

[56] References Cited

U.S. PATENT DOCUMENTS

| | | | |
|---|---|---|---|
| 738,268 | 9/1903 | Williams | 52/250 |
| 758,828 | 5/1904 | Wight et al. | 52/250 |
| 1,221,150 | 4/1917 | Davis | 52/336 |
| 1,250,588 | 12/1917 | Kahn | 52/336 |
| 1,734,358 | 11/1929 | Yeager | 52/334 |
| 1,897,763 | 12/1932 | Henderson | 52/334 |
| 2,137,009 | 11/1938 | Stromberg | 52/220.3 X |
| 3,074,208 | 1/1963 | Seidel | 52/220.4 |
| 3,093,933 | 6/1963 | Slingluff | 52/220.4 X |
| 3,110,049 | 11/1963 | Nagin | 52/334 |
| 3,177,619 | 4/1965 | Benjamin | 52/334 |
| 3,282,017 | 11/1966 | Rothermel | 52/334 |
| 3,453,791 | 10/1967 | Fork . | |
| 3,564,799 | 2/1971 | Hanson | 52/334 |
| 3,609,210 | 9/1971 | Guritz | 52/220.1 X |
| 3,721,051 | 3/1973 | Fork . | |
| 3,751,576 | 8/1973 | Klinkman et al. . | |
| 3,812,636 | 5/1974 | Albrecht et al. . | |
| 3,849,957 | 11/1974 | Bastgen . | |
| 3,886,702 | 6/1975 | Fork | 52/220.4 X |
| 3,932,696 | 1/1976 | Fork et al. . | |
| 4,030,259 | 6/1977 | Meckler . | |
| 4,194,332 | 3/1980 | Fork . | |
| 4,507,901 | 4/1985 | Carroll | 52/220.1 X |
| 4,594,826 | 6/1986 | Gray | 52/220.4 |
| 4,603,523 | 8/1986 | Albrecht et al. . | |
| 4,627,203 | 12/1986 | Presswalla et al. | 52/220.3 X |
| 4,741,138 | 5/1988 | Rongoe | 52/336 X |

Primary Examiner—Carl D. Friedman
Assistant Examiner—Robert J. Canfield
Attorney, Agent, or Firm—Shefty, Pinckney & Sawyer

[57] ABSTRACT

A reinforced concrete floor structure having reinforced concrete beams and girders supporting a metal subfloor and a monolithic concrete layer. The metal subfloor comprises alternating first and second flooring units wherein the first flooring units span across a plurality of the beams and thereby enhance the load carrying capacity of the floor structure. In one embodiment, the first flooring units comprise cellular flooring units that provide for the distribution of wiring throughout the floor structure. In alternative embodiments, the first and second flooring units each comprise cellular flooring units or each comprise non-cellular flooring units. The metal subfloor presents openings in the region of the beams and girders so that the monolithic concrete may comprise the concrete of the beams and girders and the layer of concrete covering the metal subfloor.

17 Claims, 5 Drawing Sheets

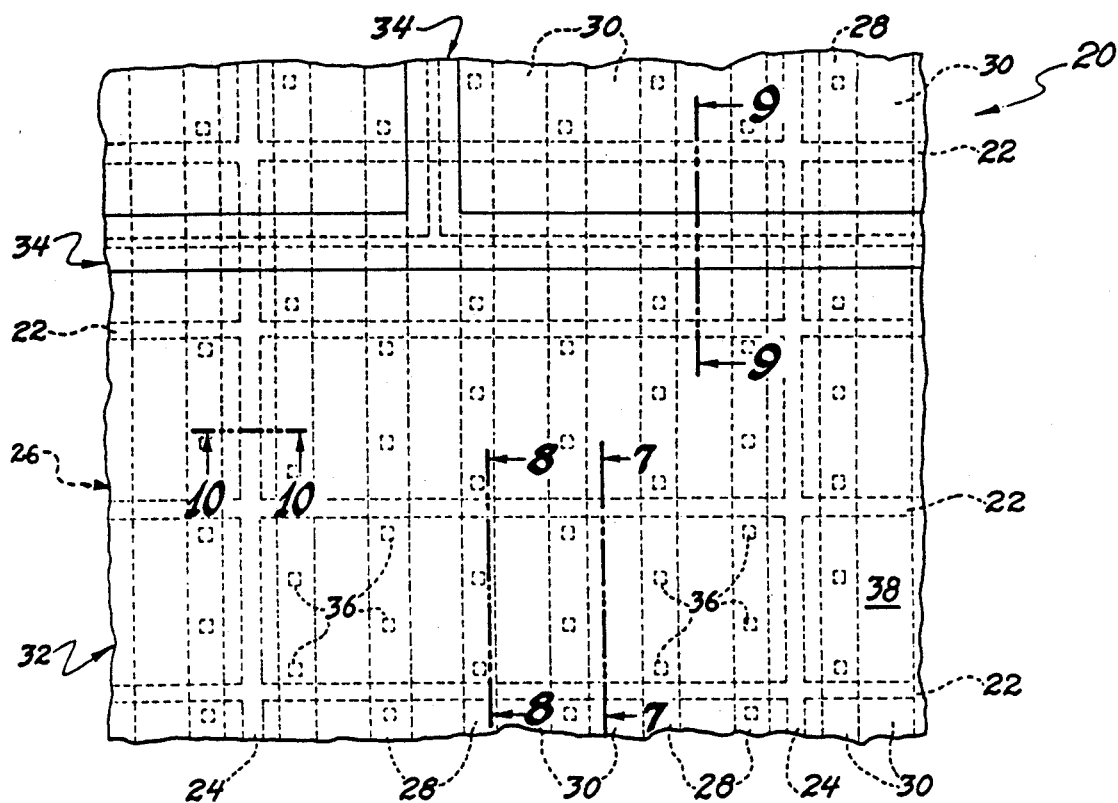
Fig. 1
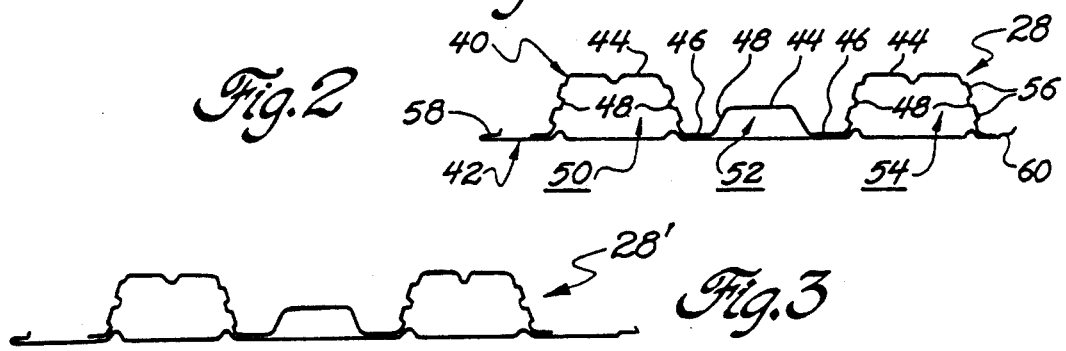
Fig. 2
Fig. 3
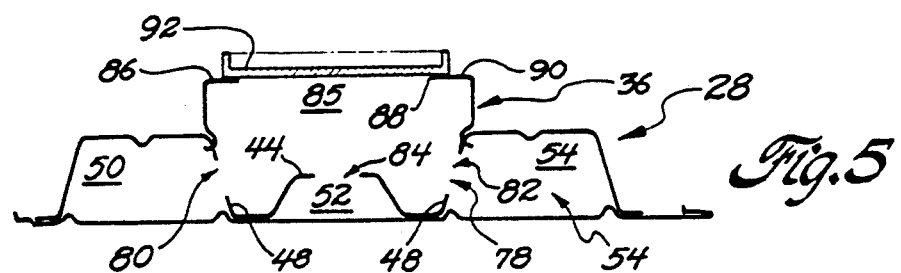
Fig. 4
Fig. 5

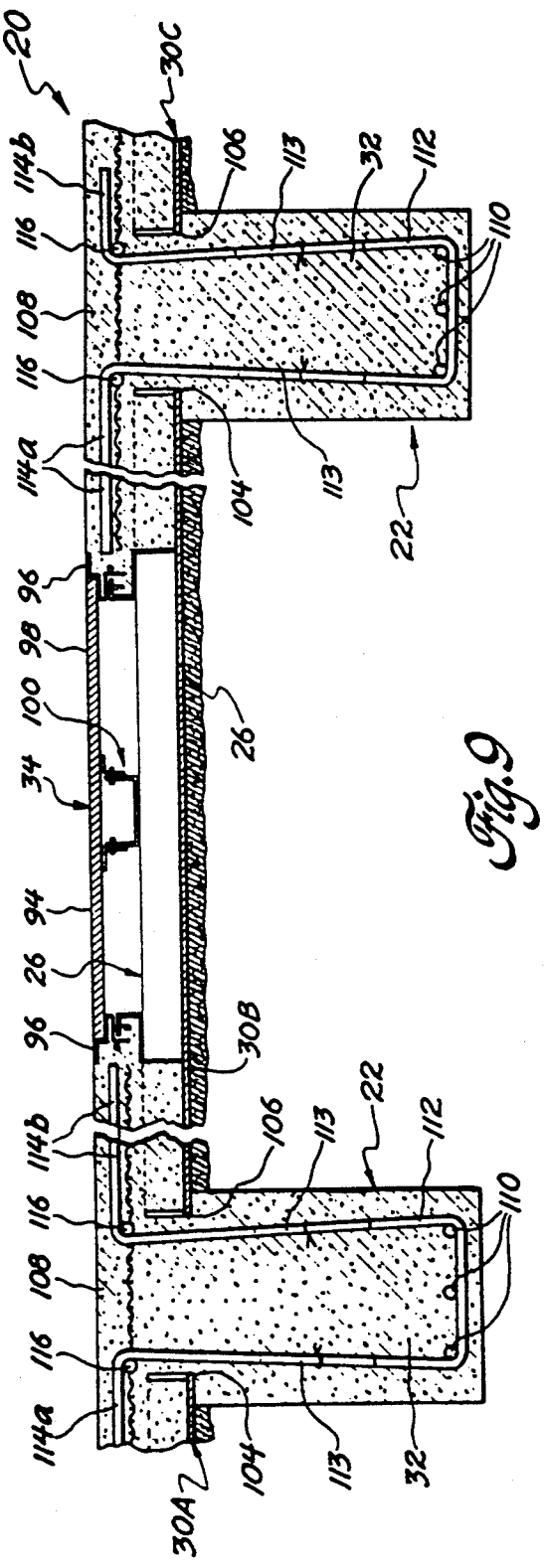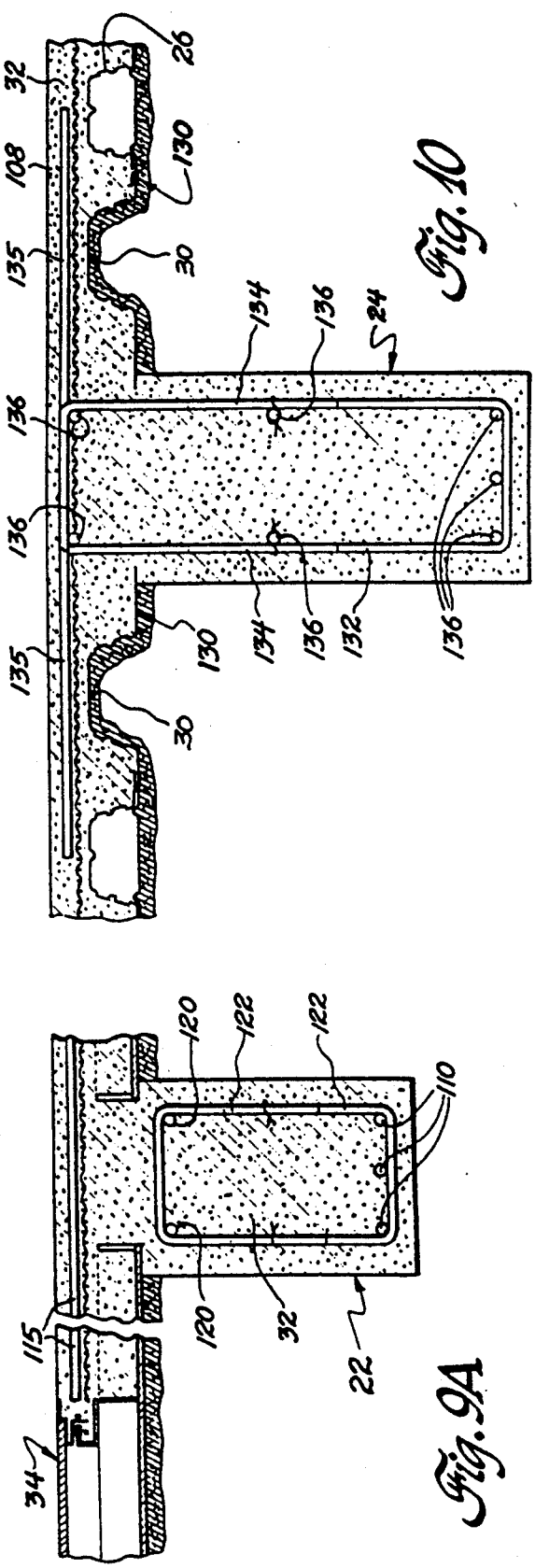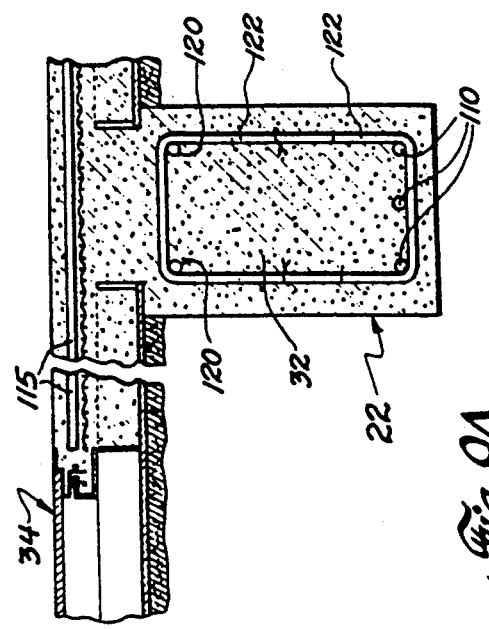

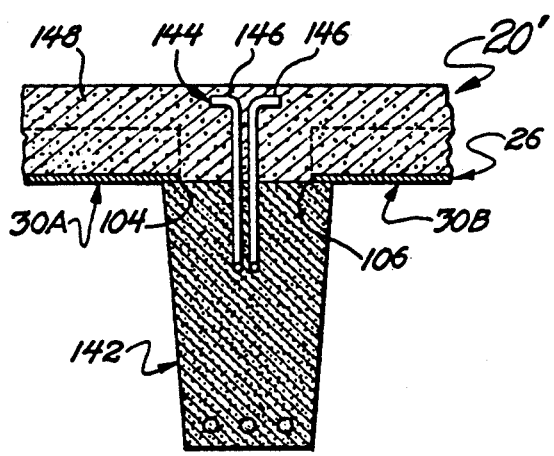
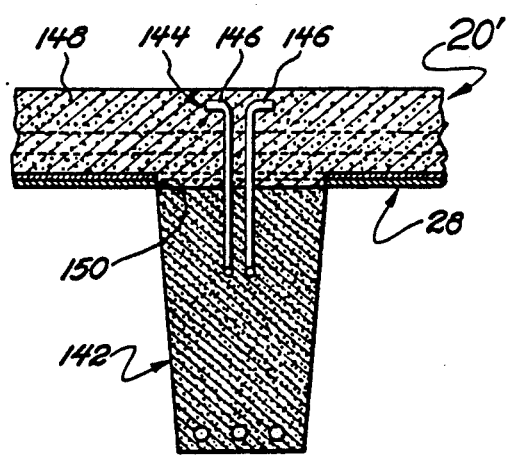
Fig. 13     Fig. 14
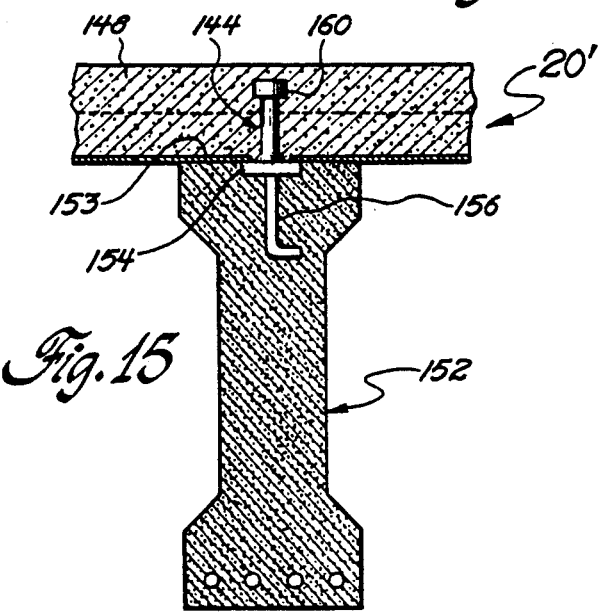
Fig. 15
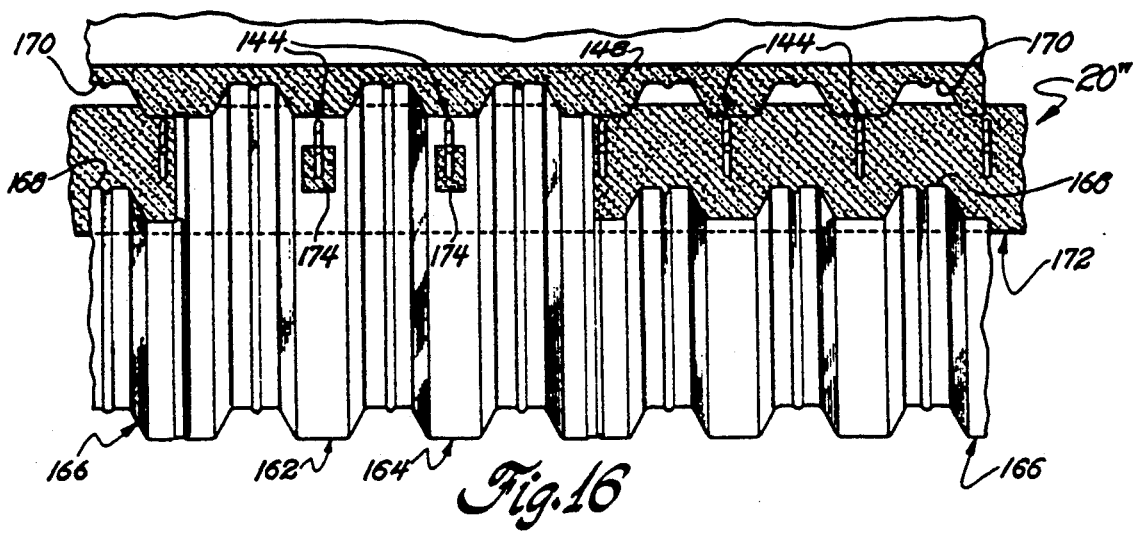
Fig. 16

UNDERFLOOR WIRE DISTRIBUTING REINFORCED CONCRETE FLOOR STRUCTURE

BACKGROUND OF THE INVENTION

1. Field of the Invention

This invention relates to reinforced concrete floor structures, and more particularly to reinforced concrete floor structures incorporating an underfloor wire distributing system.

2. Description of the Prior Art

Concrete-framed buildings, particularly those which are cast-in-situ, utilizing wire distributing raceway systems are known. Such systems incorporate single cell ducts or multi-celled units embedded in the concrete floor slabs, to distribute the wiring of various services, such as, power, telephone and computer, to each office building workstation. See for example U.S. Pat. Nos. 3,453,791 (FORK), 3,751,567 (KLINKMAN ET AL), 4,030,259 (MECKLER), and 4,194,322 (FORK). The multi-celled units (also known as cellular flooring units) and the ducts (also called underfloor ducts) are non-structural elements, that is, they do not assist in carrying vertical loads.

The use of single skin profiled metal units as a support structure for the reinforced concrete layer is know. See, for example, U.S. Pat. No. 3,849,957 (BASTGEN). Such support structures do not provide for the distribution of electrical wiring.

Other methods of providing a wire distributing function in concrete-framed buildings are either uneconomical or present structural problems. For example, an access or pedestal floor arrangement performs no role other than to create a wiring plenum above the floor slab. The access or pedestal floor is an expensive system requiring extra building height. Poke through wiring systems and other ceiling plenum systems have limited capacity and require core drilling through the concrete slab to access the wiring from the ceiling plenum below the slab.

SUMMARY OF THE INVENTION

The principal object of this invention is to provide an improved reinforced concrete floor structure.

Another object of this invention is to provide an improved reinforced concrete floor structure having wire distributing system incorporated therein.

Still another object of this invention is to incorporate metal cellular flooring units in cast-in-situ concrete floor structures, wherein they serve as a concrete form, as a load-supporting structural element, and as a wire distributing member.

A further object of this invention is to provide a reinforced concrete floor structure having an improved load carrying capacity.

The present invention provides improvements in a reinforced concrete floor structure of the type having an upper surface and including reinforced concrete beams and girders, a metal subfloor spanning between adjacent beams and girders, and monolithic concrete providing a concrete layer covering the metal subfloor and the beams and girders. The metal subfloor presents elements which key the subfloor to the concrete whereby the metal subfloor coacts compositely with the concrete to support all vertical loads.

In accordance with the present invention, the metal subfloor includes first and second flooring units wherein the first flooring units comprise cellular flooring units extending across a plurality of the beams and provides plural wiring conduits or cells extending the length of the flooring units. The flooring units have sets of outlet openings spaced along the length of the units. Preset outlet means are provided, each enclosing one of the sets of openings, for gaining access to the outlet openings from the upper surface of the floor structure.

Further in accordance with the present invention, the second flooring units comprise cellular flooring units. Alternatively, the second flooring units may, instead, comprise non-cellular flooring units, at least one interposed between each pair of the cellular flooring units. The non-cellular flooring units span only between adjacent beams. The non-cellular flooring units on opposite sides of each beam present spaced-apart unit ends between which the monolithic concrete extends.

Still further in accordance with the present invention, the beams and girders may comprise precast units. In this case, shear tie means are provided which extend upwardly from the precast beams through openings in the metal subfloor for joining the precast beams to the monolithic concrete.

Still further in accordance with the present invention, the first and second flooring units of the metal subfloor may all comprise non-cellular flooring units. The first non-cellular flooring units extend across a plurality of the beams whereas each of the second non-cellular flooring units extend between adjacent ones of the beams. The second non-cellular flooring units on opposite sides of each beam present spaced-apart unit ends between which the monolithic concrete extends. Shear tie means extend from the beams upwardly between the spaced-apart unit ends into the monolithic concrete thereby structurally tying the monolithic concrete to the beams.

BRIEF DESCRIPTION OF THE DRAWINGS

FIG. 1 is a fragmentary plan view of the reinforced floor structure of this invention incorporating a metal subfloor and a layer of monolithic concrete;

FIGS. 2 to 4 are end views illustrating typical cellular and non-cellular flooring units employed to form the metal subfloor;

FIG. 5 is a fragmentary cross-sectional view, taken along the line 5—5 of FIG. 6, illustrating a preset insert;

FIG. 9 is a cross-sectional view taken along the line 9—9 of FIG. 1;

FIG. 9A is a cross-sectional view, similar to FIG. 9, illustrating an alternative reinforcing bar arrangement;

FIG. 10 is a cross-sectional view taken along the line 10—10 of FIG. 1;

FIGS. 13 and 14 are cross-sectional views, similar to FIGS. 7 and 8, illustrating alternative methods of tying the metal subfloor and a subsequently poured monolithic concrete to a precast beam or girder;

FIG. 15 is a view, similar to FIGS. 13 and 14, illustrating a further alternative method of tying the metal subfloor and the subsequently poured monolithic concrete to a precast beam or girder; and FIG. 16 is an isometric view, similar to FIG. 11, illustrating a further alternative embodiment of the present invention wherein the metal subfloor is formed entirely of non-cellular flooring units.

DESCRIPTION OF THE PREFERRED EMBODIMENTS

Figure 6:
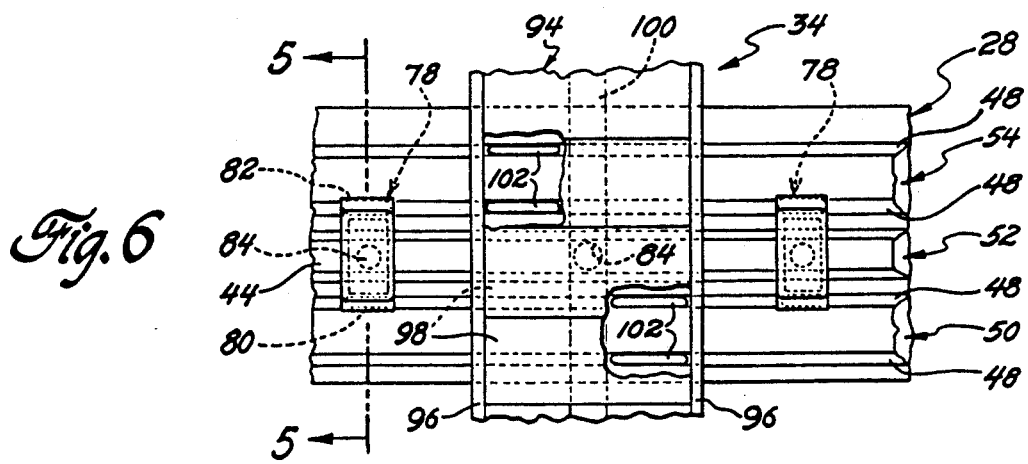
FIG. 6 is a fragmentary plan view of the intersection between a cellular flooring unit and an underfloor electrical cable trench.

FIG. 1 illustrates a reinforced concrete floor structure 20 which includes, in general, beams 22 and girders 24 supporting a metal subfloor 26 comprised of first flooring units 28 (FIG. 2) and second flooring units 30 (FIG. 4); monolithic concrete 32, and an underfloor electrical cable trench 34. The first flooring units comprise cellular flooring units 28 which are provided with preset outlet means 36 spaced along the length thereof for gaining access to outlet openings (not visible in FIG. 1) provided in the cellular flooring units 28, from the upper surface 38 of the floor structure 20.

As illustrated in FIG. 2, the cellular flooring unit 28 typically comprises a corrugated upper metal sheet 40 and a relatively flat lower metal sheet 42 secured to the upper metal sheet 40 along contiguous portions thereof. The upper metal sheet 40 presets alternating crests 44 and valleys 46, and webs 48 connecting adjacent ones of the crests 44 and the valleys 46. The upper and lower metal sheets 40, 42 cooperate to provide plural conduits or cells 50, 52 and 54. The central cell 52 normally conveys electrical power wiring. The outer cells 50, 54 normally convey telephone and computer wiring.

The webs 48 are provided with concrete keying elements, in the form of deformations, such as, embossments 56 which key the flooring unit 28 to the concrete 32 (FIG. 1) such that the flooring unit 28 coacts compositely with the concrete 32 to support vertical loads. The flooring unit 28 also is provided with marginal connector means 58, 60 along the opposite longitudinal edges thereof allowing the flooring unit 28 to be installed in side-by-side overlapped relation with adjacent flooring units 28 or with adjacent non-cellular flooring units 62 (FIG. 4).

The flooring unit 28 typically has a coverage width of 24" (61 cm.). Alternatively, a cellular flooring unit 28' (FIG. 3) may be employed having a coverage width of 30" (76.2 cm.). Other than the difference in width, the flooring units 28, 28' are identical.

Alternatively, the metal cellular flooring may comprise that unit described and illustrated in U.S. Pat. No. 3,812,636 which is assigned the assignee of this invention. U.S. Pat. No. 3,812,636 is incorporated herein in its entirety by reference.

The second flooring unit 30 may comprise non-cellular flooring unit 62 (FIG. 4) which typically presents alternating crests 64 and valleys 66, and webs 68 connecting adjacent ones of the crests 64 and the valleys 66. The crests 64 are provided with lengthwise reinforcing ribs 70. The webs 68 are provided with concrete keying elements in the form of deformations, such as, embossments 72 and in the form of lengthwise ribs 74. The valleys 66 are provided with shear resisting means for resisting movement of the concrete slab longitudinally of the flooring unit. The shear resisting means takes the form of deformations, such as, embossments 76. reference is directed to the aforesaid U.S. Pat. No. 3,812,636 for a complete discussion of the composite floor construction created by uniting concrete with the composite cellular and non-cellular flooring units.

Referring to FIG. 6, the cellular flooring unit 28 is provided with sets 78 of outlet openings spaced along the length of the flooring unit 28. As best shown in FIG. 5, the set 78 includes outlet openings 80, 82 in the confronting webs 48 of the cells 50, 54, and an outlet opening 84 in the crest 44 of the central cell 52. Each set 78 of outlet openings 80–84 is enclosed within a cavity 85 formed by the interior of the preset outlet means 36 and the upper surface of the flooring unit 28. The outlet means 36 comprises an access housing 86 having an outlet opening 88 formed in its top wall 90 and capped by a removable pan 92. For a more complete description and illustration of the preset outlet means 36, reference is made to U.S. Pat. No. 4,603,523 which is assigned to the assignee of the present invention. Another preset insert means suitable for use with the cellular flooring unit shown in the aforesaid U.S. Pat. No. 3,812,636, is described and illustrated in U.S. Pat. No. 3,932,696 which is assigned to the assignee of the present invention. U.S. Pat. Nos. 3,932,696 and 4,603,523 are incorporated herein in their entirety, by reference.

The trench header 34 preferably comprises the "bottomless trench header" described and illustrated in U.S. Pat. No. 3,721,051 which is assigned to the assignee of the present invention and which is incorporated herein in its entirety by reference. For the purposes of this invention, it is believed sufficient to state that the trench header 34 (FIGS. 6 and 9) comprises an assembly 94 including vertically adjustable sides 96 connected by cover plates 98. The assembly 94 cooperates with the upper surface of the metal subfloor 26 to create a trench structure. Vertically adjustable conduit means 100 is disposed between the metal subfloor 26 and the cover plates 98.

As best shown in FIG. 6, the conduit means 100 communicates with the central cell 52 by way of one of the outlet openings 84 and serves, for example, to convey power wiring from the trench header 34 to the central cells 52 of the cellular flooring units 28 and then to various work stations in the floor structure. In the region of the trench header 34, the webs 48 of the cells 50, 52 are provided with outlet openings 102. Thus, telephone and computer wiring extending through the trench header 34 may be distributed by way of the openings 102 and the cells 50, 52 to various work stations in the floor structure.

Figure 7:
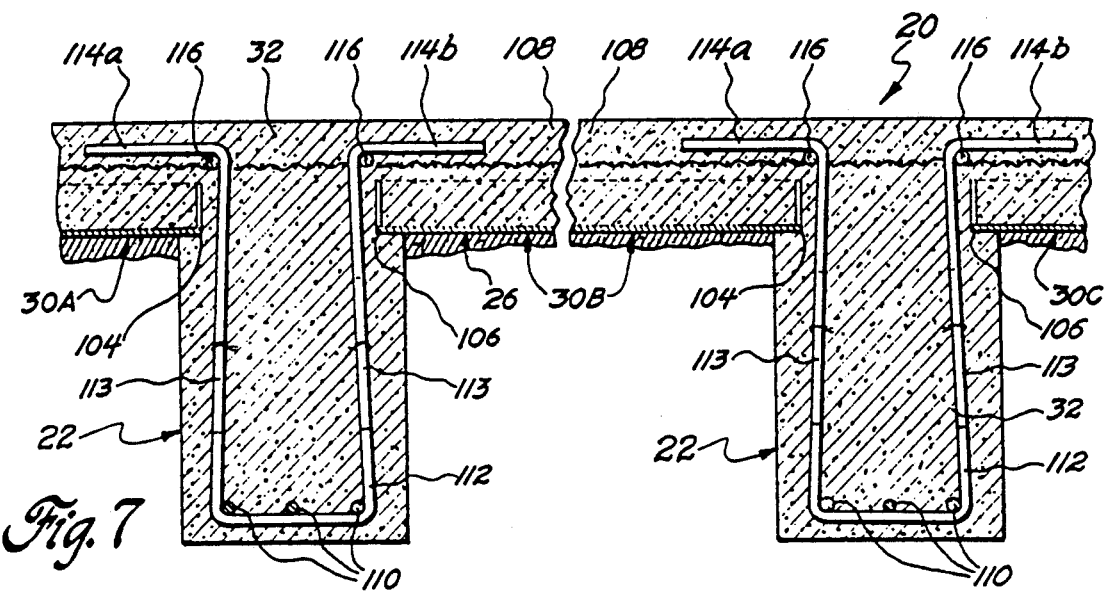
FIG. 7 is a cross-sectional view taken along the line 7—7 of FIG. 1.
Figure 11:
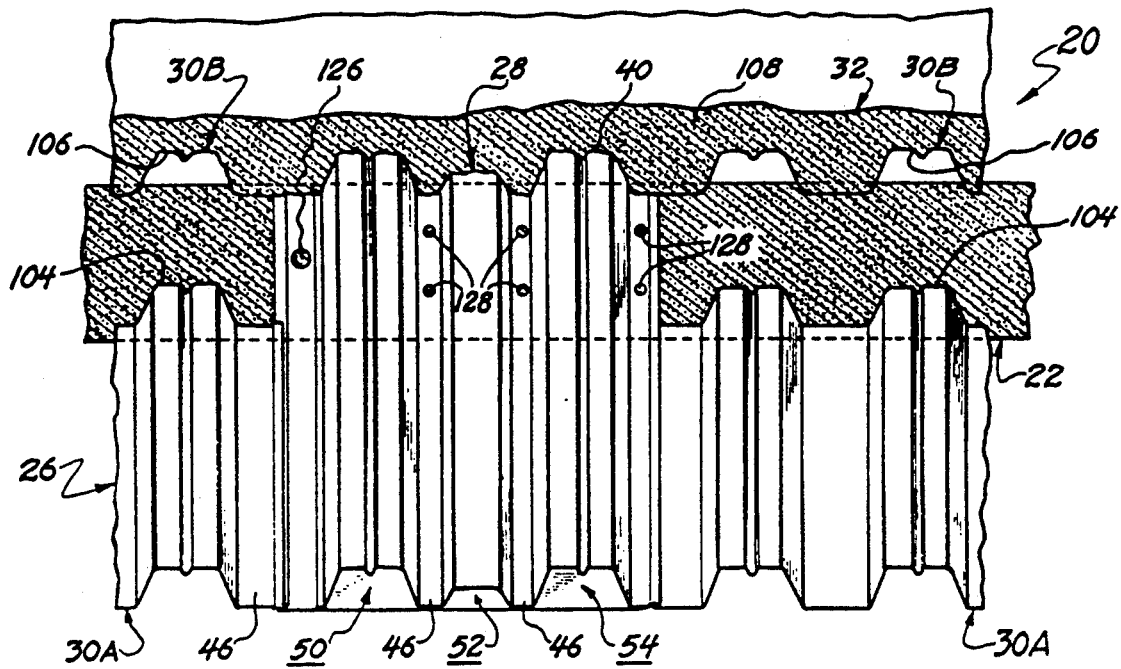
FIG. 11 is an isometric view illustrating an embodiment of the present floor structure wherein a concrete receiving opening is provided between adjacent non-cellular flooring units at the location of a beam.

As best shown in FIGS. 7, 9 and 11, each non-cellular flooring unit 30 extends only between adjacent beams 22. The flooring units 30 on opposite sides of each beam 22, that is, the flooring units 30A, 30B and 30B, 30C, present spaced-apart flooring unit ends 104, 106 between which the concrete 32 extends. As shown, the monolithic concrete 32 provides a concrete layer 108 covering the non-cellular flooring units 30 which are elements of the metal subfloor 26. When forming the floor structure 20, wet concrete 32 flows downwardly between the spaced-apart unit ends 104, 106 and forms the concrete of the beams 22 and, as will be described in connection with FIG. 10, also forms the concrete of the girders 24. The beams 22 are reinforced by longitudinal rebars 110 positioned below the neutral axis, in the region to be subjected to tensions; and by U-shaped stirrup bars 112 and L-shaped rebars 113 which project vertically through the beam 22, between the unit ends 104, 106. The L-shaped rebars 113 terminate in laterally outwardly projecting ends 114a, 114b. The stirrup bars 112 and rebars 113 are uniformly spaced-apart along the length of the beams 22, from about 6 to about 18 inches (15 to 46 cm). The stirrup bars 112 and rebars 113 serve to fix the position of the longitudinal rebars 110, 116; and to resist diagonal tension cracking in the beams 22 when the beams are subjected to vertical loading.

Figure 8:
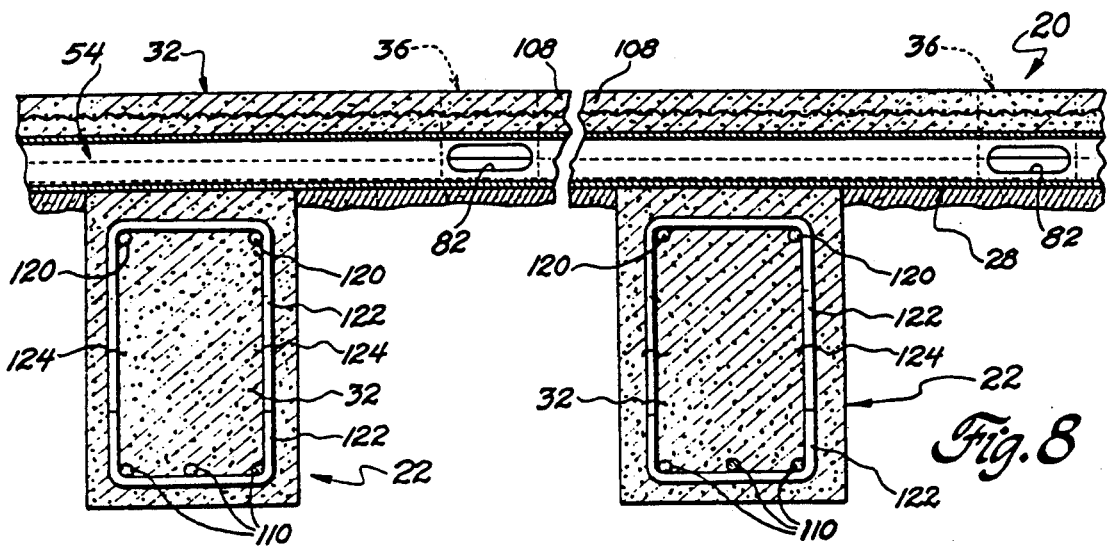
FIG. 8 is a cross-sectional view taken along the line 8—8 of FIG. 1.

As best shown in FIG. 8, each of the cellular flooring units 28, according to the present invention, extend across a plurality of the beams 22. Each of the beams 22 are reinforced by lower and upper longitudinal rebars 110, 120. A pair of U-shaped stirrup bars 122 surround the rebars 110, 120 and are tied together by wires 124. The U-shaped stirrup bars 122 are uniformly spaced-apart along the length of the beams 22, from about 6 to about 18 inches (15 to 46 cm). The stirrup bars 122 serve to fix the position of the longitudinal rebars 110, 120; and to resist diagonal tension cracking in the beams 22 when the beams 22 are subjected to vertical loading.

As best shown in FIG. 11, the cellular flooring unit 28 is provided with air relief holes either in the form of a single large air relief hole 126 or a plurality of small air relief holes 128, all formed in the valleys 46 of the upper metal sheet 40 and in the lower metal sheet 42. The holes 126 or 128 are provided in the region of the beams 22. The holes 126 or 128 preclude air being trapped beneath the cellular flooring unit 28 and the wet concrete 32 during formation of the beams 22.

Referring to FIG. 9, it will be observed that the trench header 34 displaces concrete needed for composite action between the concrete 32 and the metal subfloor 26. Conventionally, spans incorporating trench headers are designed non-compositely so that the metal subfloor carries the full dead load and live load for the life of the structure. In accordance with the present invention, the bar ends 114a, 114b of the L-shaped rebars 113, are deployed above and perpendicularly to the beams 22 and to the trench header 34, and extend to points adjacent to the trench header 34. After the concrete 32 cures, the stirrup bars 112 and rebars 113 resist negative moments at the beams 22 thereby reducing the net positive moment resisted by the composite metal subfloor 26.

FIG. 9A illustrates an alternative reinforcing bar arrangement for beams positioned on opposite sides of the trench header 34. As shown, the beam 22 is reinforced by the stirrup bars 122 which surround the longitudinal rebars 110, 120. Elongated rebars 115 are deployed above and perpendicularly to the beams 22 and to the trench header 34, and extend to points adjacent to the trench header 34. The rebars 115 resist negative moments at the beams 22 thereby reducing the net positive moment resisted by the composite metal subfloor 26.

Referring to FIG. 10, it will be observed that flooring segments 130 of the non-cellular flooring units 30 reside on opposite sides of the girder 24 and are laterally spaced-apart. Lower U-shaped stirrup bars 132 and upper L-shaped stirrup bars 134 surround longitudinal rebars 136. The upper L-shaped stirrup bars 134 have bar segments 132 extending above and perpendicularly to the girders 24 and laterally outwardly over the metal subfloor 26. Thus, the girders 24 and the concrete slab are united by the stirrup bars 132, 134 and act compositely to resist vertical loads. The stirrup bars 132, 134 are uniformly spaced-apart along the length of the beams 22, from about 6 to about 18 inches (15 to 46 cm); serve to fix the position of the longitudinal rebars 136; and to resist diagonal tension cracking in the girders 24 when the girders 24 are subjected to vertical loading.

Figure 12:
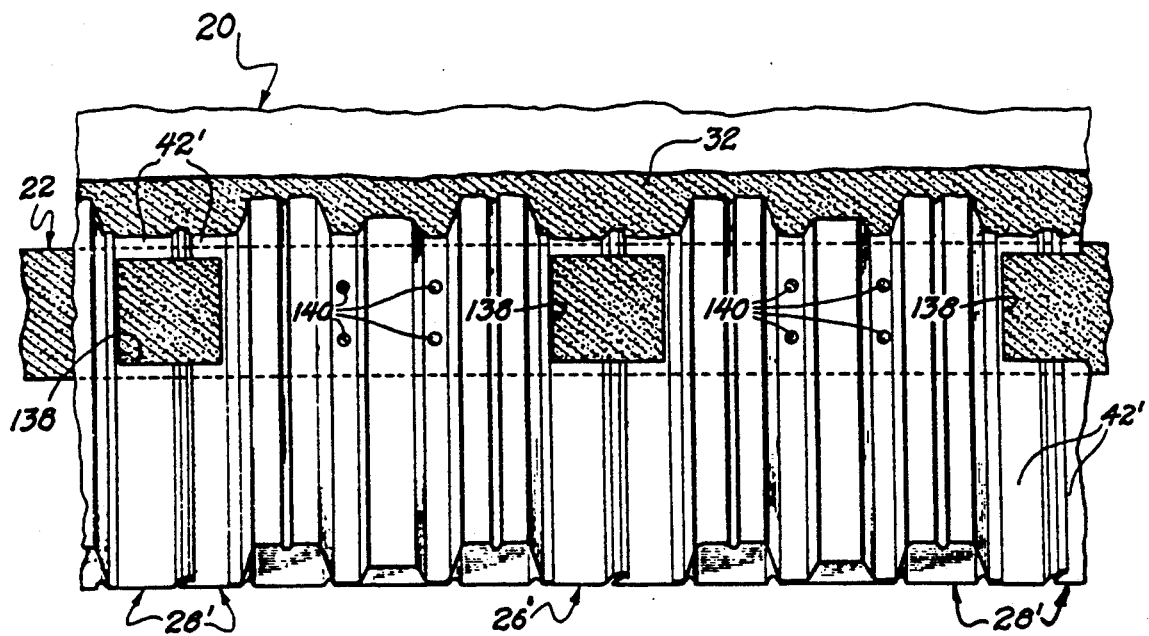
FIG. 12 is an isometric view, similar to FIG. 11, illustrating an alternative embodiment of the present floor structure wherein concrete receiving openings are provided in the cellular flooring units at the location of the beams.

In the embodiment illustrated in FIG. 11, the metal subfloor 26 comprised cellular and non-cellular flooring units 28, 30. Alternatively, as shown in FIG. 12, the metal subfloor 26' may be assembled entirely of the cellular flooring units 28 (FIG. 3). In the FIG. 12 embodiment, large openings 138 are provided in the lower metal sheet 42' of the cellular flooring unit 28', to allow the wet concrete 32 to flow therethrough when forming the beams 22. In addition, air relief holes 140 are provided in the flooring unit 28' in the region of the beam 22 thereby precluding air entrapment and the formation of undesirable pockets beneath the flooring units 28'.

The present invention also contemplates floor structures 20' (FIGS. 13, 14) which incorporates precast reinforced beams 142, each having upwardly projecting shear tie means 144 in the form of rebars 146. The rebars 146 have opposite ends embedded in the precast beam 142 and in the layer of monolithic concrete 148 overlying the metal subfloor 26. In FIG. 13, the rebars 146 project upwardly between the unit ends 104, 106 of the non-cellular flooring units 30A, 30B. In FIG. 14, the rebars 146 project upwardly through openings 150 (only one visible in FIG. 14) in the cellular flooring unit 28. The shear tie means 144 structurally joins the precast beams 142 to the monolithic concrete 148.

FIG. 15 illustrates a precast reinforced concrete beam 152 having a plate 154 exposed at its upper surface 153. A bar 156 secured to the plate 154, is embedded in the beam 152. A stud 160 is welded through the flooring unit to the plate 154 and is subsequently embedded in the monolithic concrete 148 overlying the metal subfloor 26. The stud 160 comprises the shear tie means 144 for structurally joining the precast beam 152 and the monolithic concrete 148.

The present invention also contemplates a floor structure 20" (FIG. 16) incorporating beams 172 and girders (not shown) which may comprise either cast-in-situ beams and girders or precast beams and girders. In the floor structure 20", a metal subfloor 162 is provided comprised of first and second non-cellular flooring units 164, 166. The first non-cellular flooring units 164—like the cellular flooring units 28 (FIG. 8)—extend across a plurality of concrete beams 172. The second non-cellular flooring units 166—like the non-cellular flooring units 30 (FIG. 7)—extend solely between adjacent units 28 beams 172. In the region of each beam 172, the second flooring units 166 present confronting unit ends 168, 170 which are spaced-apart to expose the beams 172. As can be seen, the shear tie means 144 project from the beams 172 and are positioned to be embedded in the monolithic concrete layer 148. Also, as can be seen, the first non-cellular flooring unit 164 has openings 174 through which the shear tie means 144 extend.

SUMMARY

It should be readily apparent from the foregoing description that the present invention provides an improved reinforced concrete floor structure; incorporating a wire distributing system; arranged to improve the load carrying capacity of the floor structure; and a cast-in-situ floor structure incorporating metal cellular flooring units serving as a concrete form, a load supporting structural element, and as a wire distributing member.

Although the invention has been shown in connection with certain specific embodiments, it will be readily apparent to those skilled in the art that various changes in form and arrangement of parts may be made to suit requirements without departing from the spirit and scope of the invention.

I claim:

1. In a reinforced concrete floor structure of the type including reinforced concrete beams and girders, a metal subfloor spanning between adjacent ones of said beams and said girders, and monolithic concrete providing a concrete layer covering said metal subfloor and the concrete of said beams and said girders, said metal subfloor presenting elements which key said subfloor to said concrete whereby said metal subfloor coacts compositely with said concrete to support all vertical loads, said floor structure having an upper surface, the improvement comprising:

said metal subfloor including first and second flooring units assembled in side-by-side overlapped relations, said first flooring units comprising cellular flooring units extending across a plurality of said beams and providing plural conduits extending lengthwise of said cellular flooring units, said second flooring units comprising cellular flooring units extending across a plurality of said beams, each of said cellular flooring units having outlet openings spaced along the length of said units;

outlet means enclosing said outlet openings for gaining access to the outlet openings from said upper surface of said floor structure;

each of said cellular flooring units including an opening directly above each of said beams through which said monolithic concrete is introduced in forming said beams; and including reinforcing means extending from said beams through said opening into said monolithic concrete thereby structurally tying said concrete layer to said beams.

2. The floor structure as defined in claim 1 wherein each of said cellular flooring units is provided with air relief holes along the region of each of said beams.

3. In a reinforced concrete floor structure of the type including reinforced concrete beams and girders, a metal subfloor spanning between adjacent ones of said beams and said girders, and monolithic concrete providing a concrete layer covering said metal subfloor and the concrete of said beams and said girders, said metal subfloor presenting elements which key said subfloor to said concrete whereby said metal subfloor coacts compositely with said concrete to support all vertical loads, said floor structure having an upper surface, the improvement comprising:

said metal subfloor including first and second flooring units assembled in side-by-side overlapped relation, said first flooring units comprising cellular flooring units extending across a plurality of said beams and providing plural conduits extending lengthwise of said cellular flooring units, each of said cellular flooring units having outlet openings spaced along the length of said units;

said second flooring units comprising non-cellular flooring units extending between adjacent beams, said non-cellular flooring units being on opposite sides of each of said beams and presenting spaced-apart unit ends between which said monolithic concrete extends; and outlet means enclosing said outlet openings for gaining access to the outlet openings from said upper surface of said floor structure.

4. The floor structure as defined in claim 3 wherein each of said cellular flooring units is provided with air relief holes along the region of each of said beams.

5. In a reinforced concrete floor structure of the type including reinforced concrete beams and girders, a metal subfloor spanning between adjacent ones of said beams and said girders, and monolithic concrete providing a concrete layer covering said metal subfloor and the concrete of said beams and said girders, said metal subfloor presenting elements which key said subfloor to said concrete whereby said metal subfloor coacts compositely with said concrete to support all vertical loads, said floor structure having an upper surface, the improvement comprising:

said metal subfloor including first and second flooring units assembled in side-by-side overlapped relation, said first flooring units comprising cellular flooring units extending across a plurality of said beams and providing plural conduits extending lengthwise of said cellular flooring units, each of said cellular flooring units having outlet openings spaced along the length of said units;

outlet means enclosing said outlet openings for gaining access to the outlet openings from said upper surface of said floor structure;

an underfloor electrical cable trench means extending across said metal subfloor for distributing wiring of various services to specified ones of said conduits of said cellular flooring units, said trench means including removable covers flush with the upper surface of said floor structure;

one of said beams residing adjacent to each side of said trench mans; and reinforcing bar means extending horizontally across said beams and over said, metal subfloor for reducing the net positive moment resisted by said metal subfloor.

6. The floor structure as defined in claim 5 wherein said second flooring units comprise cellular flooring units extending across a plurality of said beams.

7. The floor structure as defined in claim 5 wherein said second flooring units comprise non-cellular flooring units extending between adjacent beams, said non-cellular flooring units being on opposite sides of each of said beams and presenting spaced-apart unit ends between which said monolithic concrete extends.

8. The floor structure as defined in claim 7 wherein each of said cellular flooring units is provided with air relief holes along the region of each of said beams.

9. In a reinforced concrete floor structure of the type having an upper surface and including precast reinforced concrete beams and girders, a metal subfloor spanning between adjacent ones of said beams and between adjacent ones of said girders, and monolithic concrete covering said metal subfloor, said metal subfloor presenting elements which key said subfloor to said concrete whereby said metal subfloor coacts compositely with said concrete to support all vertical loads, the improvement comprising:

said metal subfloor including first and second flooring units, said first flooring units comprising cellular flooring units extending across a plurality of said beams and providing plural conduits extending lengthwise of said cellular flooring units, each of said cellular flooring units having outlet openings spaced along the length of said units;

outlet means enclosing said outlet openings for gaining access to the outlet openings from said upper surface of said floor structure;

shear tie means extending upwardly from said precast beams through openings in said metal subfloor for joining said precast beams to said monolithic concrete; and said second flooring units comprising non-cellular flooring units extending between adjacent beams, said second flooring units being on opposite sides of each of said beams and presenting spaced-apart unit ends between which said shear tie means extends.

10. The floor structure of claim 9 wherein each of said cellular flooring units is provided with air relief holes along the region of each of said beams.

11. In a reinforced concrete floor structure of the type having an upper surface and including precast reinforced concrete beams and girders, a metal subfloor spanning between adjacent ones of said beams and between adjacent ones of said girders, and monolithic concrete covering said metal subfloor, said metal subfloor presenting elements which key said subfloor to said concrete whereby said metal subfloor coacts compositely with said concrete to support all vertical loads, the improvement comprising:

said metal subfloor including first and second flooring units assembled in side-by-side overlapped relation, said first flooring units comprising cellular flooring units extending across a plurality of said beams and providing plural conduits extending lengthwise of said cellular flooring units, each of said cellular flooring units having outlet openings spaced along the length of units;

outlet means enclosing said outlet openings for gaining access to the outlet openings from said upper surface of said floor structure;

shear tie means extending upwardly from said precast beams through openings in said metal subfloor for joining said precast beams and said precast girders to said monolithic concrete;

an underfloor electrical cable trench means extending across said metal subfloor for distributing wiring of various services to specified ones of said conduits of said cellular flooring units, said trench means including removable covers flush with the upper surface of said floor structure;

one of said beams residing adjacent to each side of said trench means; and reinforcing bar means extending horizontally across said beams and over said metal subfloor to points adjacent to said trench means for reducing the net positive moment resisted by said metal subfloor.

12. The floor structure as defined in claim 11 wherein said second flooring units comprise cellular flooring units extending across a plurality of said beams.

13. The floor structure as defined in claim 11 wherein said second flooring units comprise non-cellular flooring units extending between adjacent beams, said non-cellular flooring units being on opposite sides of each of said beams and presenting spaced-apart unit ends between which said shear tie means extend.

14. The floor structure as defined in claim 13 wherein each of said cellular flooring units is provided with air relief holes along the region of each of said beams.

15. In a reinforced concrete floor structure of the type having an upper surface and including reinforced concrete beams and girders, a metal subfloor spanning between adjacent ones of said beams and said girders, and monolithic concrete providing a concrete layer covering said metal subfloor and comprising the concrete of said beams and said girders, said metal subfloor presenting elements which key said subfloor to said concrete whereby said metal subfloor coacts compositely with said concrete to support all vertical loads, the improvement comprising:

said metal subfloor comprising first and second flooring units, said first flooring units extending across a plurality of said beams, each of said second flooring units extending between adjacent ones of said beams, said second flooring units on opposite sides of each of said beams presenting spaced-apart unit ends between which said monolithic concrete extends; and reinforcing means extending from each of said beams upwardly between said spaced-apart unit ends into said monolithic concrete thereby structurally tying said monolithic concrete to said beams.

16. The floor structure as defined in claim 15 wherein said first and second flooring units comprise non-cellular flooring units.

17. The floor structure as defined in claim 15 wherein said first flooring units comprise cellular flooring units and said second flooring units comprise non-cellular flooring units.

* * * * *